(12) United States Patent
Lu et al.

(10) Patent No.: US 8,930,826 B2
(45) Date of Patent: Jan. 6, 2015

(54) EFFICIENTLY SHARING USER SELECTED INFORMATION WITH A SET OF DETERMINED RECIPIENTS

(75) Inventors: Freddy PL Lu, New Taipei (TW); Giant HM Tu, Taipei (TW); Jason CS Yang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 13/189,751

(22) Filed: Jul. 25, 2011

(65) Prior Publication Data
US 2012/0192085 A1    Jul. 26, 2012

(30) Foreign Application Priority Data

Jul. 30, 2010   (TW) ................................. 99125561 A

(51) Int. Cl.
G06F 3/048   (2013.01)
H04L 12/58   (2006.01)
G06Q 10/10   (2012.01)

(52) U.S. Cl.
CPC .............. H04L 51/14 (2013.01); G06Q 10/107 (2013.01); H04L 51/32 (2013.01)
USPC ........................................................ 715/752

(58) Field of Classification Search
CPC combination set(s) only.
See application file for complete search history.

(56) References Cited

U.S. PATENT DOCUMENTS

| | | | | |
|---|---|---|---|---|
| 5,583,763 A | * | 12/1996 | Atcheson et al. | ............. 707/750 |
| 5,774,868 A | * | 6/1998 | Cragun et al. | ............... 705/7.31 |
| 6,016,475 A | * | 1/2000 | Miller et al. | ................. 705/7.29 |
| 6,308,175 B1 | | 10/2001 | Lang et al. | |
| 6,489,980 B1 | | 12/2002 | Scott et al. | |
| 6,778,941 B1 | * | 8/2004 | Worrell et al. | ................ 702/176 |
| 7,080,139 B1 | | 7/2006 | Briggs et al. | |
| 7,092,936 B1 | * | 8/2006 | Alonso et al. | ................. 707/737 |

(Continued)

FOREIGN PATENT DOCUMENTS

TW   200935250 A   8/2009
WO   2009108732 A2   9/2009

OTHER PUBLICATIONS

Macedo, et al. "Automatically sharing web experiences through a hyperdocument recommender system". http://portal.acm.org/citation.cfm?id=900061, 2003, New York, USA.

(Continued)

*Primary Examiner* — Phenuel Salomon
(74) *Attorney, Agent, or Firm* — Patents of Demand P.A.; Brian K. Buchheit; Scott M. Garrett

(57) ABSTRACT

Information concerning a set of recipients of previously conveyed messages from a sender can be collected. Patterns between content of the previously conveyed messages and each of the set of recipients can be determined and stored. Information can be selected within a user interface to share with others. The selected information can be analyzed and matched against the stored patterns. A subset of the recipients can be automatically determined. The subset can be those recipients likely to be interested in the selected information based on results of the analyzing and the matching. The information can be conveyed within at least one message from a sender device of the sender to one or more remotely located devices. Each of the one or more remotely located devices can be devices associated with at least a portion of the subset of the recipients.

17 Claims, 12 Drawing Sheets

(56) References Cited

U.S. PATENT DOCUMENTS

| | | | |
|---|---|---|---|
| 7,590,619 B2* | 9/2009 | Hurst-Hiller et al. | 1/1 |
| 8,560,678 B2* | 10/2013 | Tseng | 709/224 |
| 2002/0032602 A1* | 3/2002 | Lanzillo et al. | 705/14 |
| 2002/0082901 A1* | 6/2002 | Dunning et al. | 705/10 |
| 2002/0103873 A1* | 8/2002 | Ramanathan et al. | 709/206 |
| 2004/0103092 A1* | 5/2004 | Tuzhilin et al. | 707/3 |
| 2004/0117222 A1* | 6/2004 | Rokosz et al. | 705/7 |
| 2004/0225716 A1 | 11/2004 | Shamir et al. | |
| 2005/0004986 A1 | 1/2005 | Aoki et al. | |
| 2005/0210024 A1* | 9/2005 | Hurst-Hiller et al. | 707/5 |
| 2005/0226166 A1 | 10/2005 | Agrawal et al. | |
| 2007/0011195 A1* | 1/2007 | Kutsumi et al. | 707/104.1 |
| 2007/0118804 A1* | 5/2007 | Raciborski et al. | 715/745 |
| 2008/0016164 A1 | 1/2008 | Chandra | |
| 2008/0027909 A1 | 1/2008 | Gang et al. | |
| 2008/0154967 A1 | 6/2008 | Heikes et al. | |
| 2008/0228537 A1* | 9/2008 | Monfried et al. | 705/7 |
| 2008/0243837 A1* | 10/2008 | Davis et al. | 707/5 |
| 2008/0294607 A1* | 11/2008 | Partovi et al. | 707/3 |
| 2008/0313256 A1 | 12/2008 | Kanazawa et al. | |
| 2009/0006078 A1 | 1/2009 | Selegey et al. | |
| 2009/0144392 A1* | 6/2009 | Wang et al. | 709/217 |
| 2010/0144440 A1* | 6/2010 | Arrasvuori et al. | 463/42 |
| 2010/0153324 A1* | 6/2010 | Downs et al. | 706/21 |

OTHER PUBLICATIONS

Li, et al. "Agent-based buddy-finding methodology for knowledge sharing". www.sciencedirect.com, Apr. 10, 2005.

* cited by examiner

EFFICIENTLY SHARING USER SELECTED INFORMATION WITH A SET OF DETERMINED RECIPIENTS

CROSS REFERENCE TO RELATED APPLICATIONS

This application claims priority of Taiwanese Patent Application Serial No. 99125561 entitled "Methodology of Effective Information Collaboration", filed on Jul. 30, 2010.

BACKGROUND

The present invention relates to a method and system for efficiently sharing information via messaging applications.

Communication tools have become indispensable for the work and social interactions. Example communication tools can include an instant message system, an e-mail system, a short message system, a network voice communication system, video conferences, a micro-blogging service system, and the like. People use one or more of these systems/tools for dispatching information to friends, family members, and/or colleagues.

Given a wide variety of voluminous information (related to news, entertainment, medicine, or foods) and the groups or communities to contact, it is often necessary to dispatch different information to specific parties promptly. It may be difficult to identify a recipient to whom the information has to be rapidly dispatched and to determine an appropriate tool for dispatching the information. Further, a dispatch address (e.g., email address, phone number, IP address, etc.) often has to be looked-up, which may require searching of multiple different contact repositories.

BRIEF SUMMARY

In one aspect of the disclosure, information concerning a set of recipients of previously conveyed messages from a sender can be collected. Patterns between content of the previously conveyed messages and each of the set of recipients can be determined and stored. Information can be selected within a user interface to share with others. The selected information can be analyzed and matched against the stored patterns. A subset of the recipients can be automatically determined. The subset can be those recipients likely to be interested in the selected information based on results of the analyzing and the matching. The information can be conveyed within at least one message from a sender device of the sender to one or more remotely located devices. Each of the one or more remotely located devices can be devices associated with at least a portion of the subset of the recipients.

In one aspect of the disclosure, targeted information to be shared can be analyzed according to a "pre-analyzed user behavior" of a set of potential candidates, wherein the pre-analyzed user behavior is determined from a set of previously conveyed messages from a sender to one of the potential candidates. A list representing a determined subset of the potential candidates can and related preference tools/applications can be presented to the sender via a user interface. Tools/applications for sending the targeted information content can be determined. An action message can be sent to said tools/applications of selected candidates, which results in each of the subset of potential candidates receiving the targeted information.

DETAILED DESCRIPTION

Figure 1:
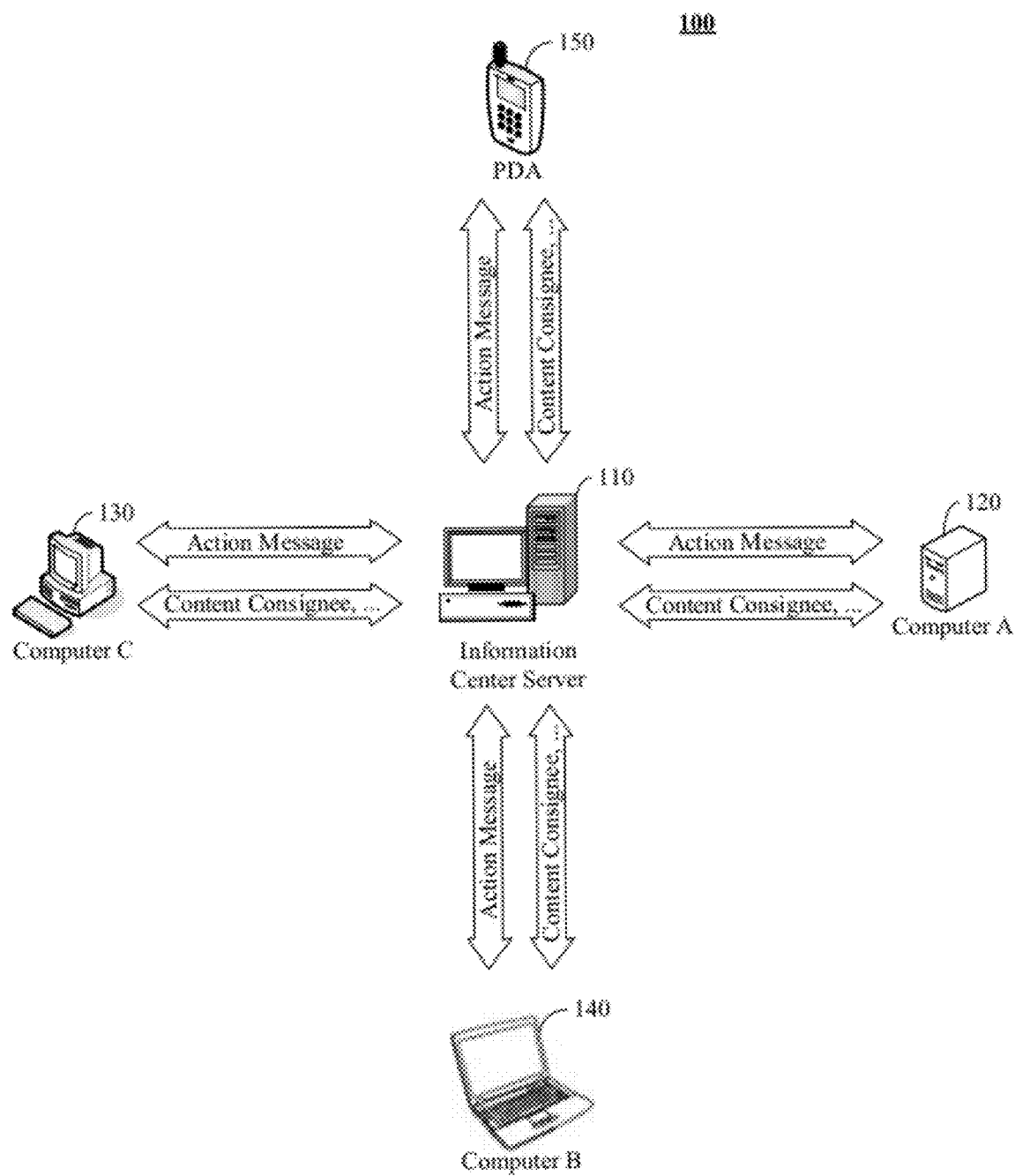
FIG. 1 shows a system for efficiently sharing information according to an embodiment of the disclosure.

Once a user browses a webpage and finds useful information or an interesting essay and wants to share it with friends/candidates concerned by means of an existing information sharing system (such as an instant message system, or an e-mail system), then the user can take the following steps.

1. specifying and reproducing useful or interesting information content from an information source;
2. opening a contact list in an instant message or in an e-mail system, and finding the communities and names of candidates/persons who share the same habit or are interested in the information;
3. determining a preferred tool for sending the information to parties concerned/candidates so as to ensure that the parties concerned are most likely to receive the information timely; and
4. sending the information to different parties concerned/candidates by different preferred tools.

The whole process of sending the information has to be performed manually and in a time-consuming manner. Usually, the information is no longer real-time information at the moment when users are reading the information. It is because, after finding the information, the users take time to share the information there between. To use different tools/applications, the users have to perform a plurality of steps in order to finalize the delivery of the information. At times, the users might not be sure whether a certain person is interested in the information, and thus the users are likely to omit some persons or send the information to wrong persons. Furthermore, the best friends of yours may lose the opportunity to receive, or may be denied the benefit from receiving, an instant message, such as breaking news, sales promotion, or limited free tickets, just because of a several minutes' delay caused by you, or because you simply forget to notify them.

Therefore, it may be imperative to eliminate the aforesaid drawbacks of the prior art by providing a solution of efficiently sharing information by dispatching information to appropriate parties concerned/candidates without specifying potential parties concerned/candidates. These problems were recognized and resolved during the course of developing the disclosure.

Thus, embodiments of the present invention provide a solution of efficiently sharing information by dispatching information to appropriate parties concerned/candidates without specifying potential parties concerned/candidates. All the users need to do is to select the information which the users want to share with each other and then inform the system entailed by the present invention of the information thus selected. Afterward, the system analyzes the information content and dispatches the information to appropriate candidates according to a "pre-analyzed user behavior" and by means of candidates' preference tools. Then, the system collects data related to the communication between the users on a daily basis, so as to create the "pre-analyzed user behavior" whenever the users use an instant message system, e-mail system, a short message system, or any other source. Hence, the present invention provides a solution of efficiently sharing information with appropriate persons quickly, conveniently, and precisely.

Embodiments of the present invention are applicable to any executable applications for providing an instant message, an e-mail, or a short message, or is applicable to electronic products, such as desktop computers, notebook computers, terminal apparatuses, mobile phones, or personal digital assistants, for use with other applications for dispatching information. Hence, the present invention allows information to be shared according to a candidate's preference and by an available tool, without being subject to limitation of time and place.

In one aspect of the present invention, a method for creating a pre-analyzed user behavior includes the steps of: collecting one or more user behavior messages from each application; segmenting information content in each of the user behavior messages; analyzing the information content to determine which group the information content should belong to; and storing results of the analyzing step.

In another aspect of the present invention, a data processing system for creating a pre-analyzed user behavior includes: a host computer, the host computer further including: a bus system; a memory connected to the bus system, wherein the memory has an instruction set; and a processing unit connected to the bus system, wherein the processing unit executes the instruction set for executing the aforementioned method.

In an aspect of the present invention a method for efficiently sharing information by analyzing information to be shared includes the steps of: analyzing targeted information content contained in a share request message; presenting a list of potential candidates and related preference tools/applications; determining tools/applications for sending the targeted information content; and sending an action message to the tools/applications of selected candidates.

In another aspect of the present invention, a data processing system for creating a pre-analyzed user behavior includes: a host computer, the host computer further including: a bus system; a memory connected to the bus system, wherein the memory has an instruction set; and a processing unit connected to the bus system, wherein the processing unit executes the instruction set for executing the aforementioned method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic view of the structure of a system 100 for efficiently sharing information according to a specific embodiment of the present invention, such that FIG. 1 enables persons skilled in the art to gain insight into the present invention rather than restricts the scope of the present invention. In an exemplary embodiment, the system 100 includes a server 110, one or more client-end computers 120, 130, 140, 150 (such as a personal computer, a notebook computer, or a mobile electronic device). The server 110 includes an information center and a user behavior database. Hence, the server is hereinafter known as an information center server. The information center includes an analyzing engine (module), a dispatching engine (module), and a synchronizing engine (module). The analyzing engine, the dispatching engine, and the synchronizing engine are described in detail below. The client-end computers 120, 130, 140, 150 are connected to the information center server 110 via a network (not shown).

According to an embodiment of the present invention, the client-end computers are electronic products for executing applications to provide an instant message, an e-mail, or a short message, or electronic products for executing other applications to dispatch information, such as desktop computers, notebook computers, terminal apparatuses, mobile phones, or personal digital assistants. The client-end computers can also execute applications like word processing services or browsers.

In one embodiment, the client-end computer is a general desktop computer including: a processor for executing various applications; a storing device for storing various information and program codes; a display device; a communication and output/input device for use as an interface for communication with the users; and peripheral elements or other elements with specific purposes. In other embodiments, the present invention may also be implemented in other manners and thus require more other devices/elements or less other devices/elements.

In one embodiment, the information center server 110 can come in the form of a general computer, a computer with a special purpose, a high-level workstation, or a large host computer as needed, without affecting the implementation of the present invention. The required network can also come in a connection of any type, including a wide area network (WAN) or a local area network (LAN) with static IP, or a temporary connection to the Internet through an Internet service provider (ISP), whether by cable connection or by wireless connection. The network can also have other hardware and software elements (such as an additional computer system, a router, or a firewall) not shown in the accompanying drawings.

Each of the client-end computers for executing various applications (such as an instant message system, an e-mail system, or a short message system) for dispatching information includes an information plug-in and thus can interact with the information center at the information center server 110. The information center server 110 is present in some contemplated embodiments and absent in others. Information can be efficiently shared among the client-end computers, provided that each of the client-end computers includes a user behavior database and the information center built in the information center server 110.

It should be noted that many of the functional units described in this specification have been labeled as modules, in order to more particularly emphasize their implementation independence. For example, a module may be implemented as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, include one or more physical or logical blocks of computer instructions, which may, for instance, be organized as an object, procedure, or function. Nevertheless, the executables of an identified module need not be physically located together, but may include disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
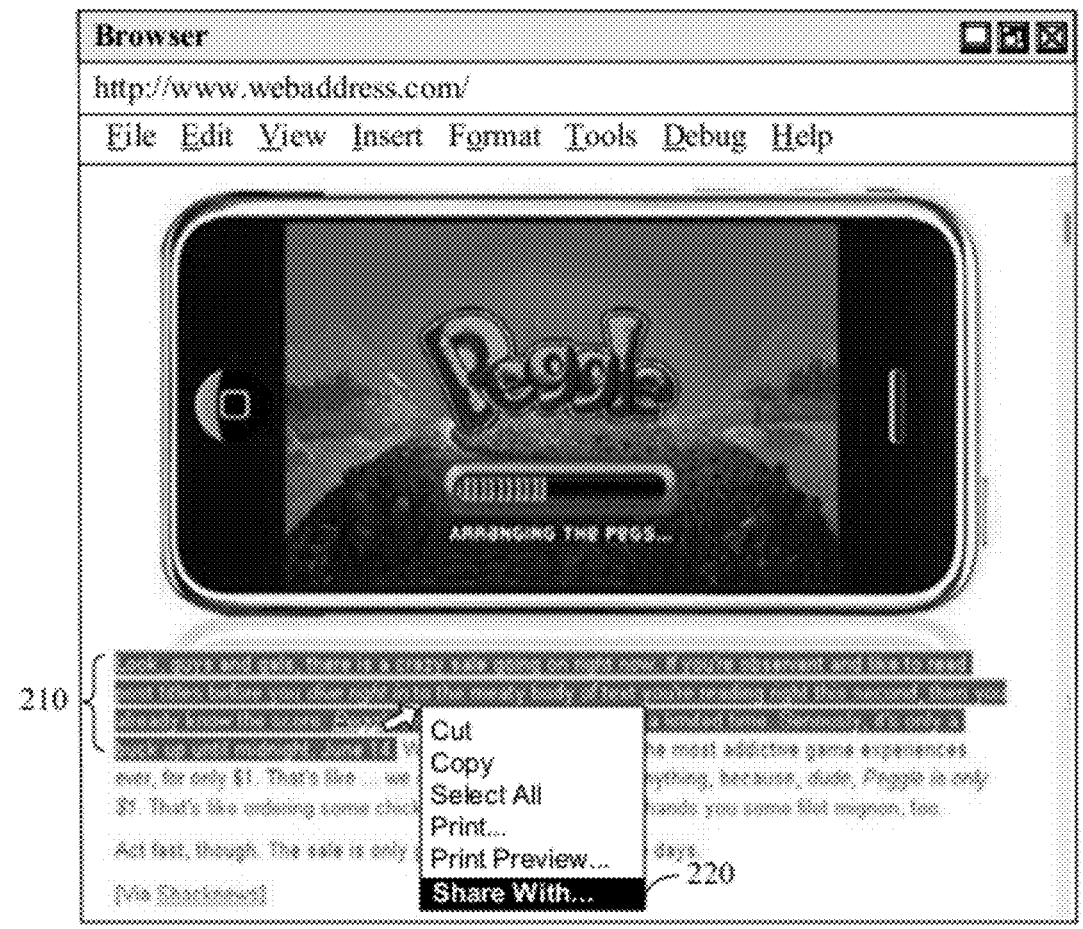
FIG. 2 and FIG. 3 show different screen display demos of a client-end display interface according to an embodiment of the disclosure.

As shown in FIG. 2, after selecting a targeted information 210 from a webpage 200, a user presses a hot key (for example, by right-clicking the mouse or pressing any specific key) or uses any other mechanism to pop up a pull-down menu 220, and then selects the "Share With" option, such that the browser calls the dispatching engine of the information center server 110. Afterward, the dispatching engine analyzes the content of the targeted information 210 according to a "pre-analyzed user behavior", and then a window 300 pops up for the user to select an option therefrom. Afterward, the dispatching engine dispatches the information to appropriate candidates by means of candidates' preference tools. The dispatching engine is described hereunder in detail by making reference to FIG. 6 and FIGS. 7A through 7C. The "pre-analyzed user behavior" is described hereunder in detail together with the analyzing engine by making reference to FIG. 4 and FIGS. 5A through 5B.

Figure 3:
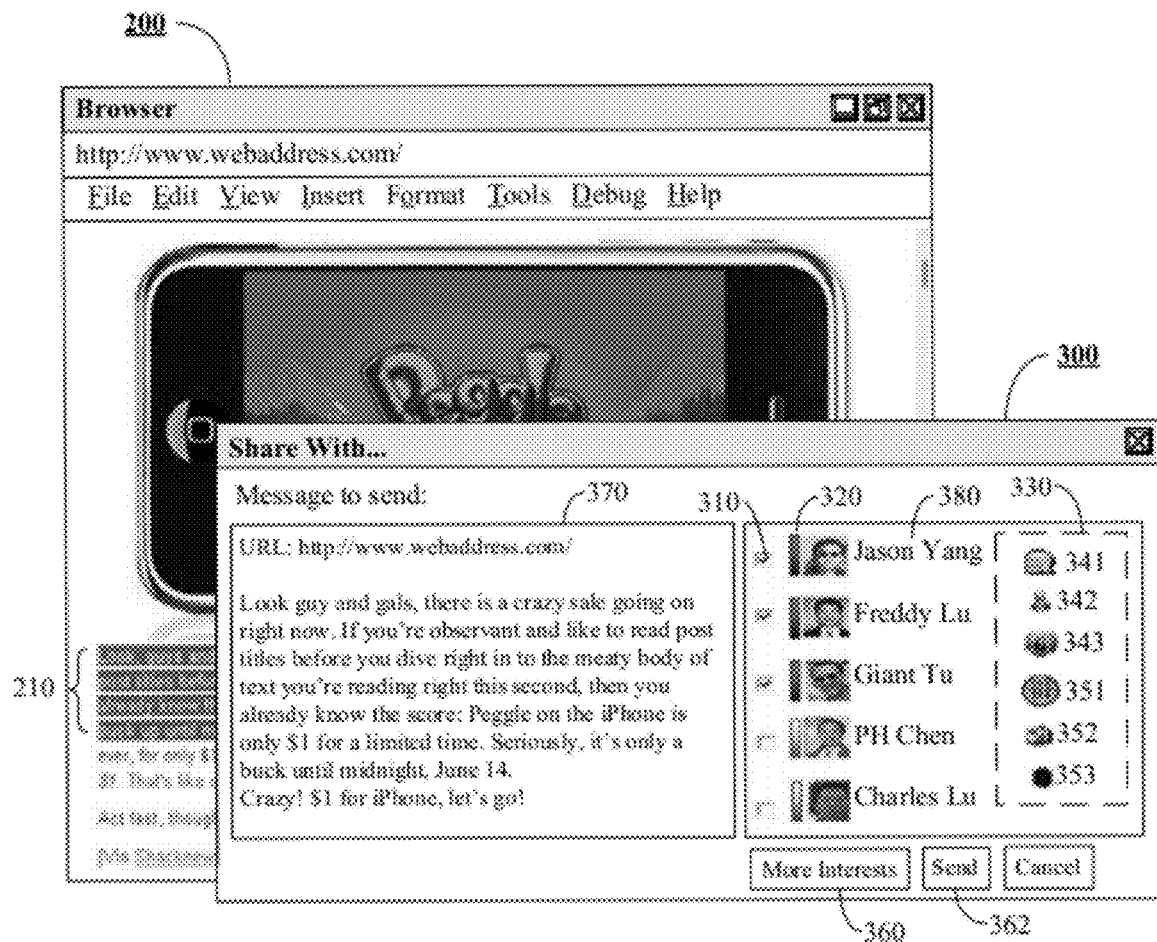

FIG. 3 shows a screen display demo of a client-end pop-up window 300 provided by the dispatching engine according to an embodiment of the present invention. The pop-up window 300 includes a message displaying region 370 and a presenting region 380. The purpose of the message displaying region 370 is to allow the user to select the targeted information 210 therefrom. The purpose of the presenting region 380 is to allow all the candidates to be determined according to the analysis of a "pre-analyzed user behavior". The presenting region 380 has a list 320 of all the candidates. Preferably, shown beside each of the candidates is a photo taken thereof to enable instant identification of the corresponding candidate. The candidates in the list can be categorized according to a similarity score. The scores are shown at vertical bars positioned to the left of the photos to indicate an interesting level of each of the candidates toward the information 210. Candidates with the same interesting level (that is, the same similarity score) are sorted by name. This technical feature is optional in the present invention. Further, it can be replaced by an alternative in other embodiments. As disclosed in the present invention, the candidates can be screened and selected according to a similarity score threshold. There is a check box 310 to the left of the vertical bar for each of the candidates. The check box 310 allows the user to select a candidate whom the information 210 will be dispatched to. According to the present invention, the pop-up window 300 can also have a "More Interests . . . " button 360 whereby the user selects more candidates manually.

The right side of the presenting region 380 has a preference tool zone 330 for presenting the tool icons of candidates' preference tool, that is, providing the tool icons, such as LOTUS SAMETIME 341, MSN 342, FIREFOX 343, LOTUS NOTES 351, or OUTLOOK EXPRESS 352, of one or more preference tools of each of the candidates for the user to choose from. The tools are sorted by preference level. For example, the tools are sorted by the frequency at which the user uses a tool when interacting with candidates, such that priority is given to frequently-used tools. In another embodiment, candidates' preference tools at the time of dispatching the information 210 are further determined by analyzing the accumulating time that the user spends interacting with candidates by the tools.

According to an embodiment of the present invention, it is feasible to list those tools which are active and available to candidates such that the user can choose the listed tools, and/or it is feasible to present enlarged icons of the tools which are available and recommended, and the aforesaid technical features are not restrictive of the present invention. The user can manually select a preference tool icon of each of the candidates; meanwhile, the selected tool icons can be enlarged and displayed, and the aforesaid technical features are not restrictive of the present invention and thus can be implemented in another manner in other embodiments.

After determining the candidates and the preference tools of each of the candidates, the user sends an action message by pressing a "Send" button 362, so as to instruct that the targeted information 210 should be dispatched to the selected candidates by candidates' preference tools. A point to note is that the aforesaid disclosure that the targeted information 210 is selected from the webpage 200 serves an illustrative purpose only, because, in fact, the targeted information 210 is not only selected from a webpage accessed by a browser, but can also be selected by means of any application capable of text-based interaction. For example, the present invention also applies to the scenario where a message from a friend is received by an e-mail application such as LOTUS NOTES and to be shared via embodiments of the present invention.

Figure 4:
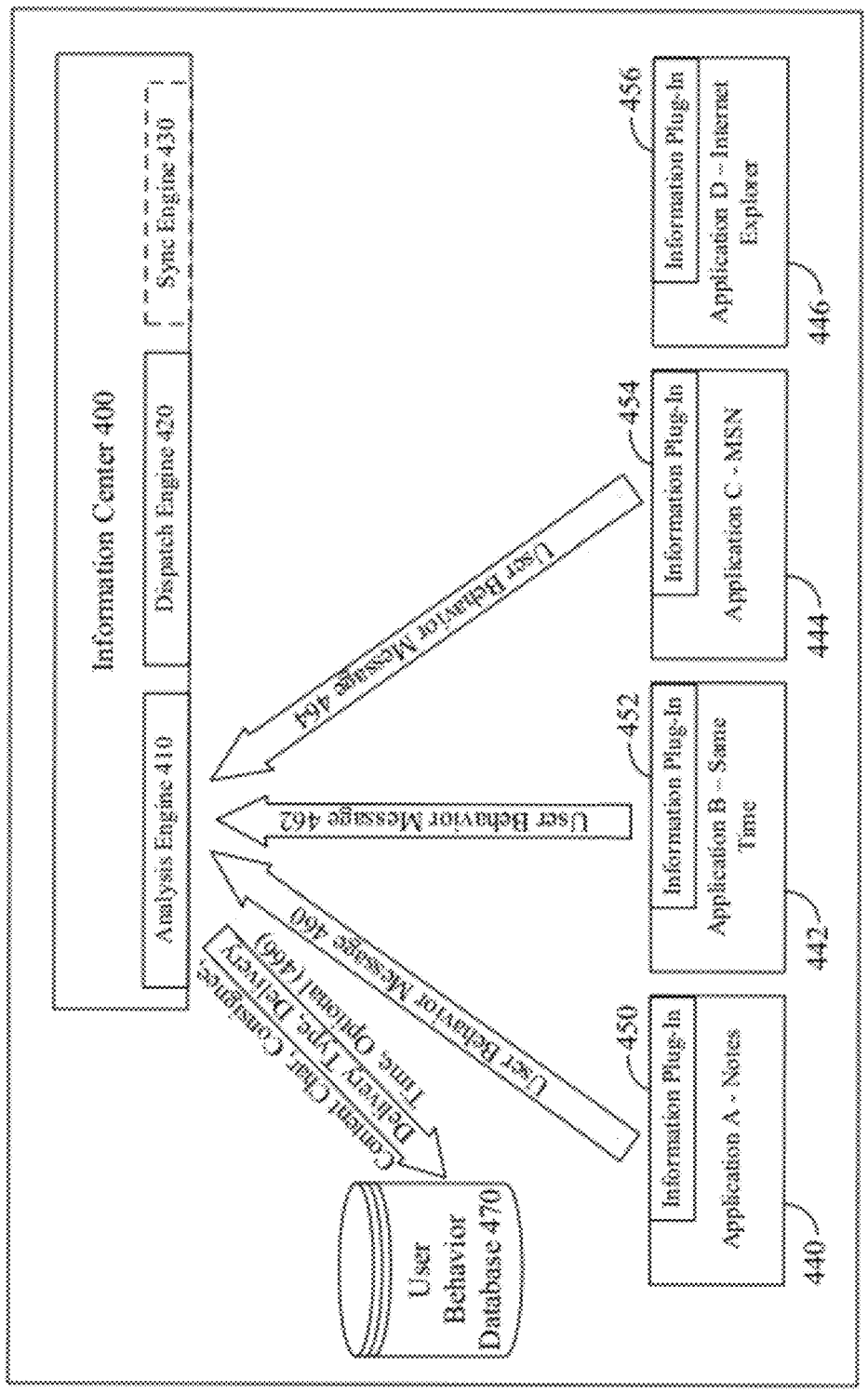
FIG. 4 is a view of transmission of messages by the analyzing engine in operation according to an embodiment of the disclosure.

FIG. 4 is a schematic view of transmission of messages by the analyzing engine in operation according to an embodiment of the present invention. An information center 400 and an information plug-in (450, 452, 454, 456) of each application are two essential elements of the embodiment. The information plug-ins 450, 452, 454, 456 are built in the applications 440, 442, 444, 446 of the client-end computer(s), respectively, to interact with the information center 400 and thereby share information. The applications or tools are either installed on different client-end computers, respectively, or installed on the same client-end computer, as shown in the drawing, and can be implemented by LOTUS NOTES 440, SAMETIME 442, MSN 444, or INTERNET EXPLORER 446.

As described above, the information center 400 includes an analyzing engine 410, a dispatching engine 420, and a synchronizing engine 430. The information center 400 can be installed on a standalone server to meet a requirement set forth by a system designer (as shown in FIG. 1), or is executed on each of the client-end computers in a way like an application is. In one embodiment, the analyzing engine 410 is implemented in the form of a daemon, but such a technical feature can be replaced by an alternative in other embodiments.

In the situation where the users of the client-end computers interact with friends by preference tools, such as an instant message, an e-mail, or a short message, the information plug-ins 450, 452, 454, 456 automatically collect data related to the user behavior and send the user behavior-related data to the analyzing engine 410 of the information center for analysis. According to an embodiment of the present invention, user behavior includes the following data (which are not limited to):

a. candidates: people interacting with the user;
b. delivery type: the employed delivery tools, such as an instant message system, an e-mail system, a short message system, or any other system;
c. delivery time: the time at which the user sends information;
d. source content: information content of interaction between the user and a friend thereof, such as a message, a mail, a short message, or any other information expressed in text;
e. other alternative information: a description of a location where the user interacts with a person, the person's gender and age, and a best available tool of delivery.

User behavior is packaged in the form of a "user behavior message" for delivery. As shown in the drawings, once the user interacts with a friend thereof by applications A, B, C, user behavior messages 460, 462, 464 will be constructed and sent to the analyzing engine 410 for analysis. The result of the analysis is stored in a user behavior database 470. For example, the information plug-in 450 of LOTUS NOTES 440 (application A) retrieves whatever is required for interaction with the user, such as the mail content, candidates, delivery type (interacting by NOTES), delivery time, or other alternative information, to construct the user behavior message 460. Then, the information plug-in sends the user behavior message 460 to the analyzing engine 410 of the information center for analysis.

The analyzing engine 410 collects all the user behavior messages and analyzes the collected user behavior messages to retrieve a candidate name, a delivery type, a delivery time, and any other alternative information and analyze source content in order to determine those candidates who are interested in the source content. The analysis result 466 is stored in the user behavior database 470 to create the "pre-analyzed user behavior". The analyzing engine 410 is preferably implemented in the form of a daemon for analyzing user behavior automatically in advance. Please refer to FIGS. 5A through 5B for a detailed description as to how to analyze the source content.

Figure 5A:
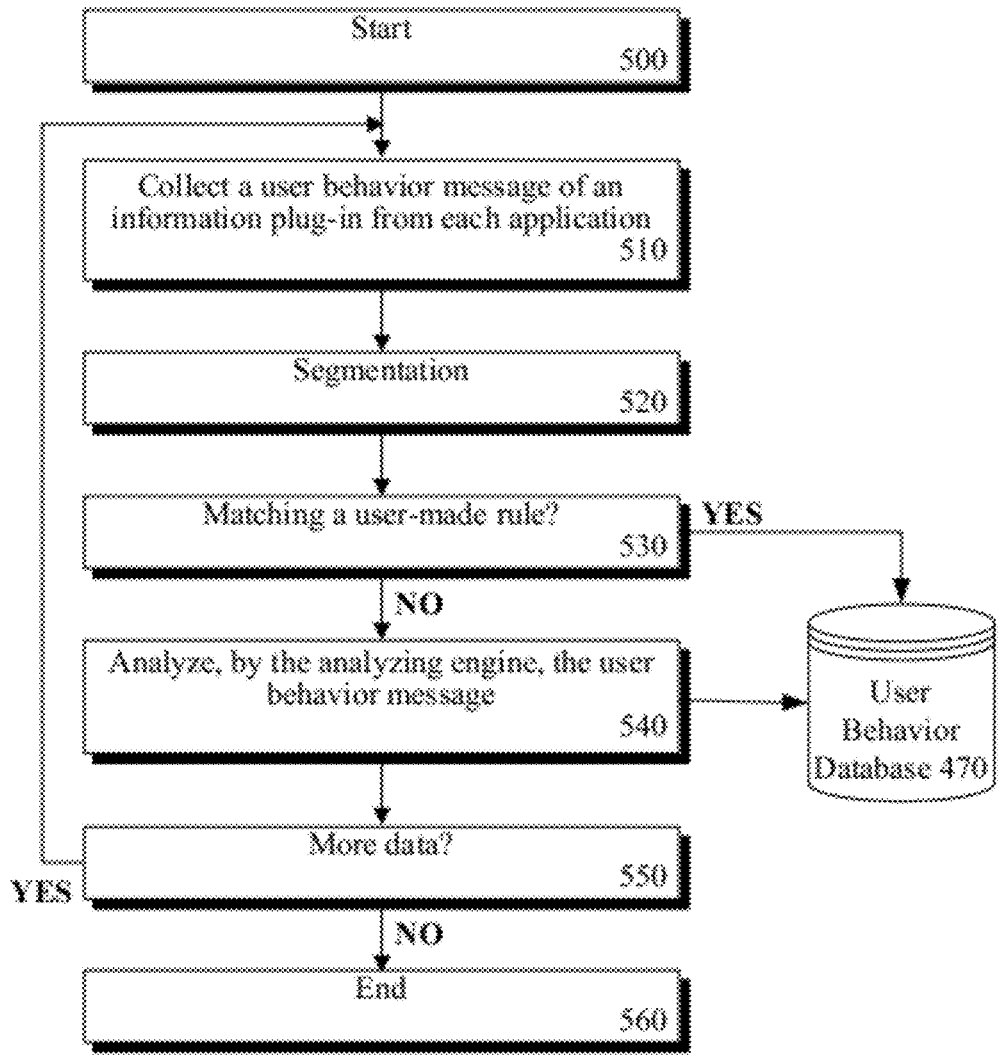
FIGS. 5A and 5B are flowcharts of operation of the analyzing according to an embodiment of the disclosure.
Figure 5B:
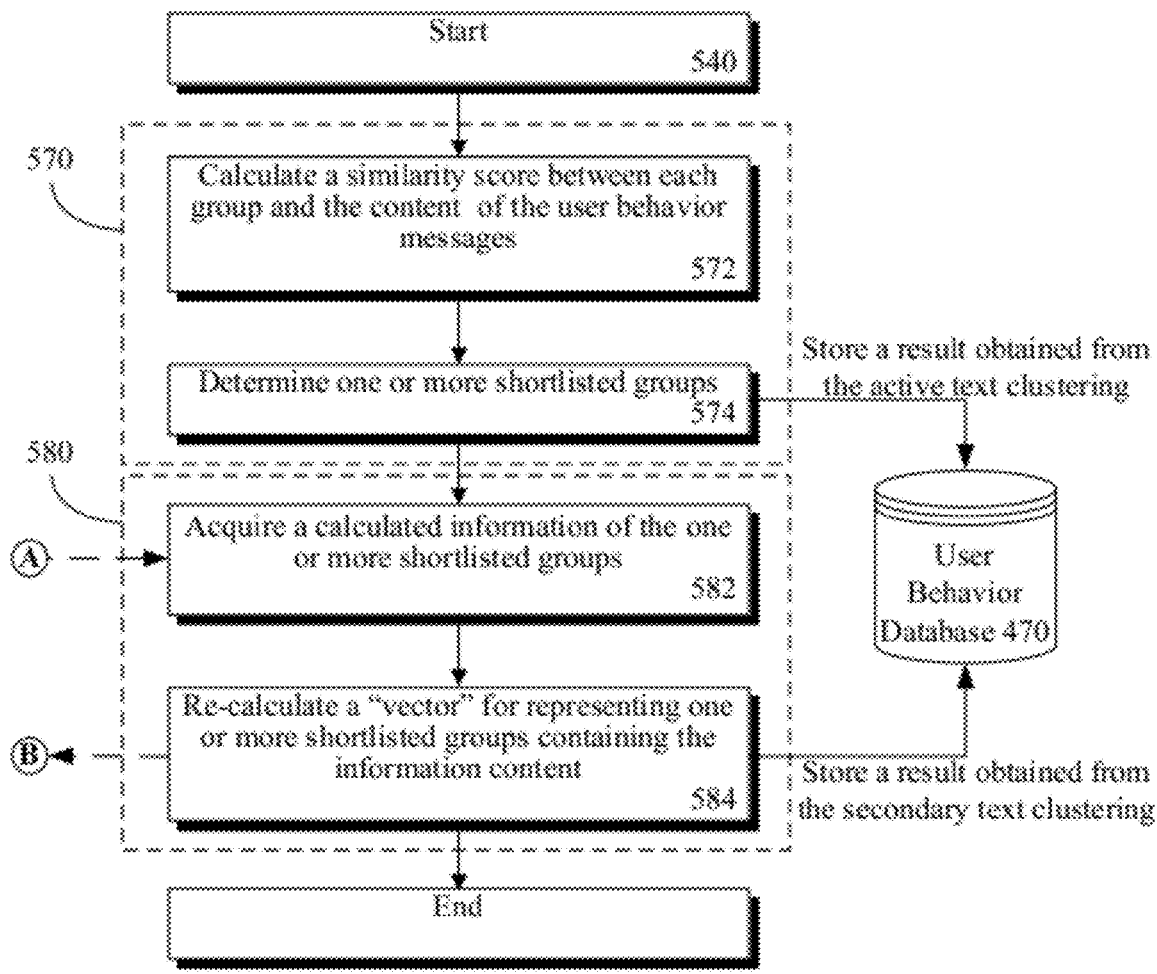

FIGS. 5A and 5B are flowcharts of operation of the analyzing engine 410 for creating the "pre-analyzed user behavior" according to a specific embodiment of the present invention. As shown in the drawings, the operation of the analyzing engine 410 includes the steps of: receiving a user behavior message of an information plug-in from each application (step 510); segmenting source content (that is, information content) in each of the user behavior messages (step 520); analyzing the information content to determine which group the information content should belong to, so as to determine information and tools preferred by a person interacting with the user (step 540). The analysis results, together with a candidate name, a delivery type, a delivery time, and any other alternative information, are stored in the user behavior database 470.

FIG. 5B further illustrates how the analyzing engine 410 analyzes information content of the user behavior message. The analyzing engine 410 analyzes information content by a conventional information retrieval technique. In a specific embodiment of the present invention, the analyzing engine 410 essentially performs two steps, namely active text clustering 570 and secondary text clustering 580 (described below), to analyze the information content. The active text clustering 570, which is based on a conventional grouping technique, involves performing a grouping (that is, categorization) operation on the information content of all the received user behavior messages. First, the active text clustering 570 has calculating a similarity score between each group stored in the user behavior database 470 and the information content of the user behavior messages according to segmentation result (step 572).

The similarity score is a cosine similarity score between each existing group and each information content, and is calculated by a conventional weighting technique on a term-basis, such as TF/IDF (term frequency-inverse document frequency), or an equivalent technique.

The TF/IDF weighting technique is usually applicable to vector space model and a cosine similarity score for determining the similarity between two documents. In a specific embodiment of the present invention, each information content is regarded as a document, and each information content can be expressed as a "vector" according to the vector space model in the aforesaid grouping technique. The vector has a component that corresponds to each term in a default dictionary and carries a weight. Normally, the weight is for assessing how important a term is to an information content (or a document), by using the aforesaid conventional TF/IDF weighting technique. In general, if a term in the dictionary is absent from the information content, the weight will equal zero. If a term in the dictionary is present in the information content and is of a high count, the weight will be high. Hence, the "vector" represents the information content. A group includes one or more information contents and thus can also be expressed as a "vector". Hence, a group information usually includes a "group ID" and a "vector" that represents the group. As a result, a cosine similarity score between vector (X) that represents the information content and vector(Y) that represents the group is defined by equation (1):

$$\cos(X, Y) = \frac{X \cdot Y}{\|X\| \cdot \|Y\|} \quad (1)$$

Referring to FIG. 5B, step 574 involves comparing a similarity score threshold with a similarity score between each group and the information content to determine one or more shortlisted groups which the information content belongs to. Hence, in a specific embodiment of the present invention, the active text clustering 570 entails determining the similarity between the information content and an existing group "automatically". During the grouping (or categorization) operation performed on the information content, if it is detected that no group is present, then a group will be created for the information content. Afterward, one or more "vectors" represents one or more shortlisted groups adding the information content are obtained using a TF/IDF weighting technique, and then one or more group information which has considered the information content (each group information includes a "group ID" and a "vector" that represents the group) of the one or more shortlisted groups and the user behavior messages related thereto (such as a candidate name, a delivery type, a delivery time, and any other alternative information) are stored in the user behavior database 470.

In a specific embodiment of the present invention, prior to the analysis of information content of the user behavior messages, the information content can also be categorized according to a user-made rule (step 530), that is, creating a criterion for determining whether the information content matches the user-made rule, for example, making a rule according to the user's preference, wherein the rule sets forth one or more terms or a combination thereof for functioning as keywords. If the keywords set forth in the rule are present in the information content, the information content will be attributed to a specific group. There can be one or more user-made rules. For example, the user can make two rules as follows:

Rule 1 sets forth two keyword groups as follows:
keyword group 1: IPHONE, 3G, CHUNGHWA
keyword group 2: HTC, TOUCH, 3G
Rule 2 sets forth one keyword group as follows:
keyword group 1: WEBSPHERE, MQ, CHANNEL, EXIT All the keywords in the same keyword group must be discovered in an information content, otherwise the match will fail. This means that all the keywords in the same keyword group have a logical "AND" relationship. By contrast, the keywords in different keyword groups have a logical "OR" relationship. Hence, once an information content A is obtained, the analyzing engine 410 will check and determine whether the information content A has "IPHONE", "3G", and "CHUNGHWA", or "HTC", "TOUCH", and "3G"; in response to an affirmative determination, the information content A is deemed a group governed by Rule 1. The analyzing engine 410 also checks and determines whether the information content A has "WEBSPHERE", "MQ", "CHANNEL", and "EXIT"; in response to an affirmative determination, the information content A is deemed a group governed by Rule 2. Once the information content A matches one of the rules, the other rules need not be checked.

Referring to FIG. 5B, the analyzing engine 410 performs the secondary text clustering 580 on the information content. First, the analyzing engine 410 acquires the one or more group IDs of the one or more shortlisted groups obtained from the active text clustering 570 (step 582). The groups include the content information. Then, the secondary text clustering 580 re-obtains one or more "vectors" for representing the one or more shortlisted groups adding the information content by combining old one or more "vectors" representing one or more shortlisted groups previously stored by the secondary text clustering 580 but being indicated by the one or more group IDs with the information content, by using the TF/IDF weighting technique (step 584).

That is, the step is to re-calculate the one or more "vectors" representing one or more shortlisted groups previously stored by the secondary text clustering 580 by combining the old one or more "vectors" in conjunction with the information content. The old one or more "vectors" do not consider the information content. Afterward, re-obtained one or more group information (each including a "group ID" and a "vector" representing the group, as described above) of the one or more shortlisted groups and the user behavior messages related thereto (such as a candidate name, a delivery type, a delivery time, and other alternative information) are stored in the user behavior database 470. In addition, the one or more group information (each including a "group ID" and a "vector" representing the group in conjunction with the information content) of the one or more shortlisted groups obtained from the active text clustering 570 and the user behavior messages related thereto are not necessarily stored in the user behavior database 470.

The one or more group information of the one or more shortlisted groups obtained from the secondary text clustering 580 and the user behavior messages related thereto can replace directly those from and related to the active text clustering 570. A point to note is that, in the stage of creating the "pre-analyzed user behavior" solely by the analyzing engine 410, the active text clustering 570 yields the same result as the secondary text clustering 580 does. In a dispatching stage described below, it is possible for the user to select a group directly and manually in step 728 (described below) and adjust manually the selected group, and thus the one or more shortlisted groups are not exactly the same as what is obtained automatically by the active text clustering 570. As a result, one or more "vectors" which are directly re-calculated to represent the one or more shortlisted groups that contain the information content are not exactly the same as the result obtained by the active text clustering 570 (step 584). It is because there is only one source inputted into the active text clustering 570, while there are two sources inputted into the secondary text clustering 580.

Figure 6:
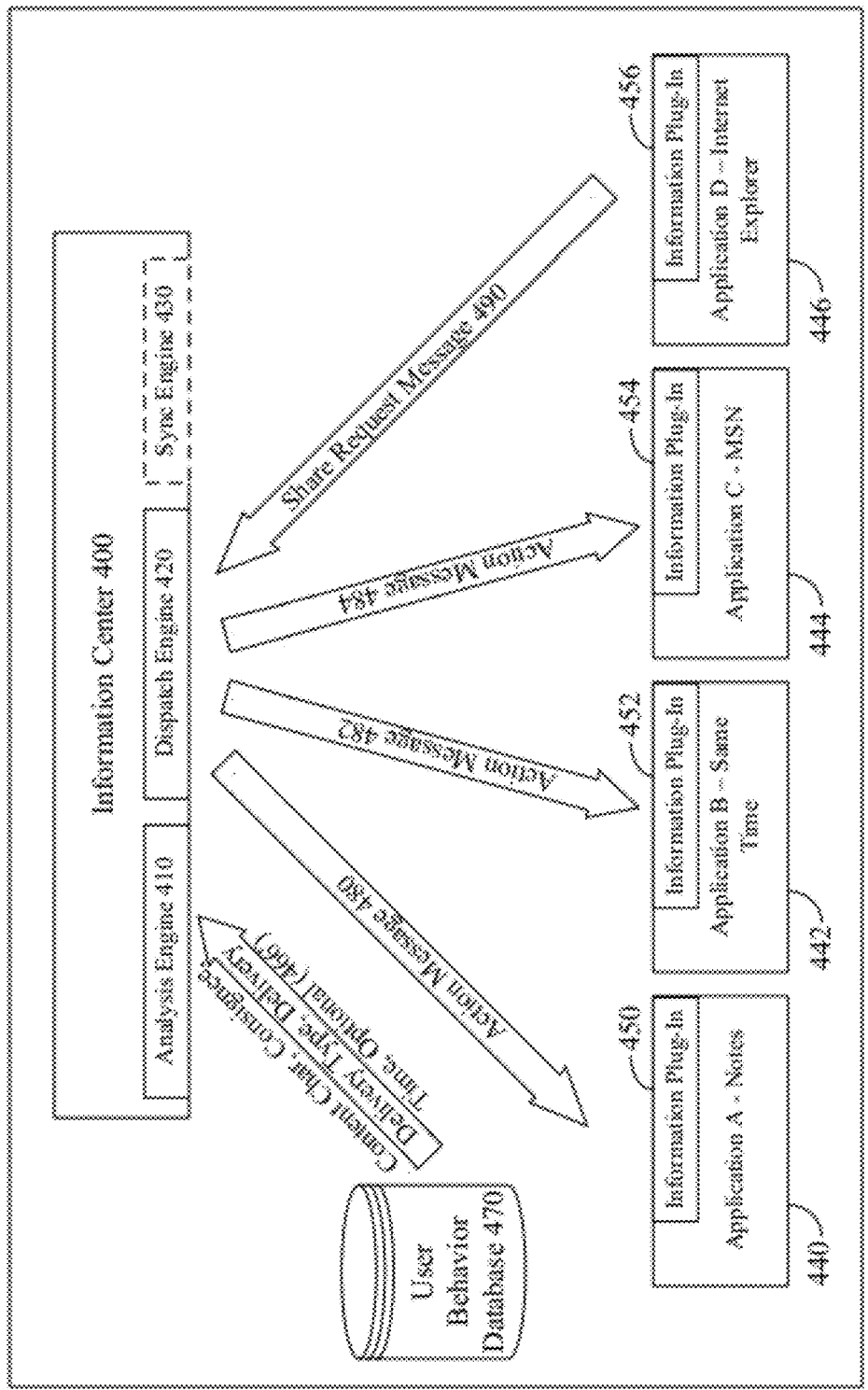
FIG. 6 is a schematic view of transmission of messages by the dispatching engine in operation according to an embodiment of the disclosure.

FIG. 6 is a schematic view of transmission of messages by the dispatching engine 420 in operation according to a specific embodiment of the present invention. As shown in FIG. 2, after selecting a targeted information 210 from a webpage 200, a user presses a hot key or uses any other mechanism to pop up a pull-down menu 220, and then selects the "Share With" option, and in consequence the information plug-in 456 of the browser 446 sends a "share request message 490" to the dispatching engine 420. The share request message 490 at least has targeted information and the current time. After receiving the share request message 490, the dispatching engine 420 analyzes the content of the targeted information 210 according to a "pre-analyzed user behavior", presents a candidate list and candidates' preference tools automatically, and sends action messages 480, 482, 484 to the information plug-ins 450, 452, 454, respectively, so as to dispatch the information to appropriate candidates by the candidates' preference tools. The action messages 480, 482, 484 at least include the targeted information and candidate names. The dispatching engine 420 is described in detail below by reference to FIGS. 7A through 7C.

Figure 7A:
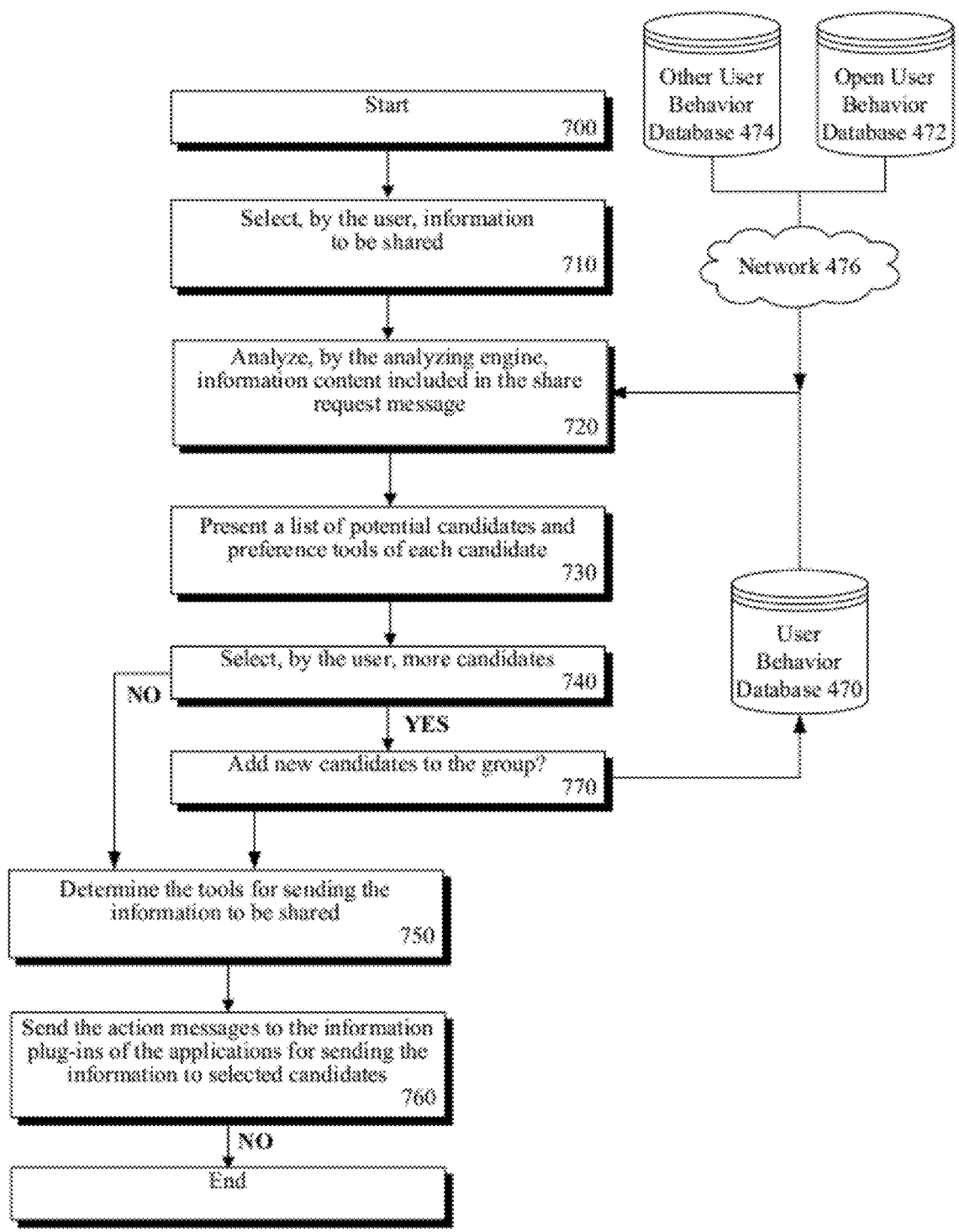
FIGS. 7A, 7B, and 7C are flowcharts of operation of the dispatching engine according to an embodiment of the disclosure.
Figure 7B:
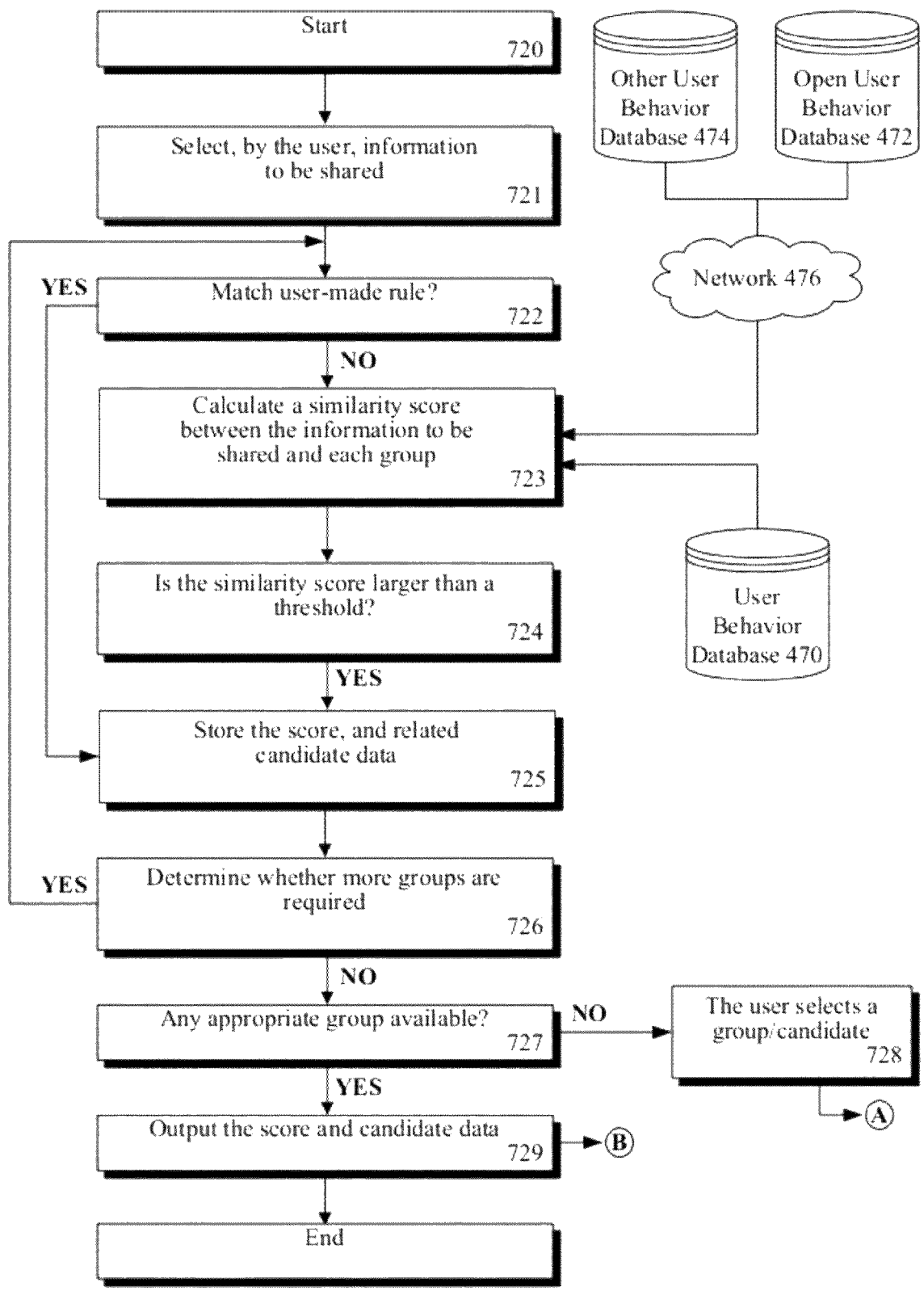
Figure 7C:
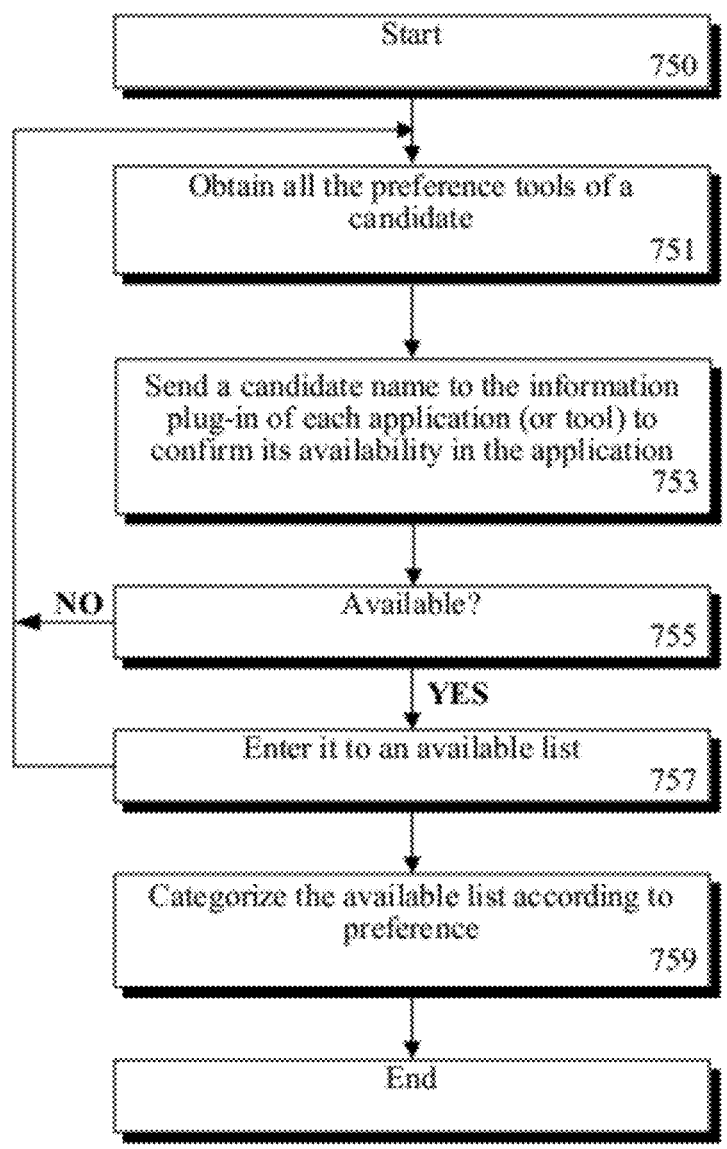

FIGS. 7A, 7B, and 7C are flowcharts of operation of the dispatching engine 420 according to a specific embodiment of the present invention. First, as shown in FIG. 2 before, a targeted information 210 is selected, and the dispatching engine 420 receives a share request message sent from an information plug-in of an application (step 710). The dispatching engine 420 calls the analyzing engine 410 in order to analyze the targeted information content included in the share request message (step 720). Step 720 is described in detail below by reference to FIG. 7B. In step 730, the dispatching engine 420 presents a list of potential candidates and related preference tools (that is, applications for sending information, as described above). Furthermore, as shown in FIG. 3, the user can manually select more candidates by means of the "More Interests . . . " button 360 (steps 740, 770). Otherwise, the dispatching engine 420 will determine the tools for sending a targeted information (step 750). Step 750 is described in detail below by reference to FIG. 7C. Afterward, the dispatching engine 420 sends the "action messages" to the corresponding information plug-ins of the applications of selected candidates, respectively (step 760).

FIG. 7B illustrates the step 720 in detail. Likewise, step 721 involves segmenting the content of the information to be shared. Afterward, if the user-made rule is available, compare and determine whether the targeted information matches the user-made rule (step 722). In response to a negative determination, call the analyzing engine 410 to calculate a similarity score between the targeted information content and each group acquired by the secondary text clustering 580 and stored in the user behavior database 470 (step 723). Then, step 724 involves comparing the similarity score with a similarity score threshold to determine one or more shortlisted groups which the information content belongs to. Step 725 involves storing the similarity score and related candidate data. If it is determined that there is no further group for the calculation a similarity score between the targeted information content and the group (Step 726), then it further needs to determine if there is any shortlisted group available (Step 727). If it is determined that shortlisted groups are absent, then the user has to select a group and a candidate directly and manually (step 728), otherwise it is necessary to output the similarity score and related candidate data directly (step 729). The similarity score is for creating the vertical bars lying to the left of the photos shown in FIG. 3, so as to indicate the candidates' interesting level in the information 210. After one or more groups and candidates directly selected by the user, the analyzing engine 410 shown in FIG. 5B is called to perform the secondary text clustering (Step 580) to the targeted information, so as to re-calculate one or more "vectors" for representing the shortlisted groups containing the targeted information content. In other words, the shortlisted groups are manually adjusted.

FIG. 7C illustrates how to determine the tools for sending a targeted information. First, the dispatching engine 420 obtains all the preference tools of a candidate (step 751), and sends a candidate name to the information plug-in of each application (or tool) to confirm its availability in the application (step 753). Determine whether an available tool is present (step 755) and, in response to an affirmative determination, enter it to an available list (step 757). Finally, the dispatching engine 420 categorizes the available list according to preference level (step 759) and creates the preference tool zone 330 for presenting the tool icons of candidates' preference tools as shown in FIG. 3.

In one embodiment of the present invention, in step 723 the dispatching engine 420 accesses an open user behavior database 472 or other user behavior database 474 at a remote end; hence, the engine is not only aware of local user behavior, but is aware of all the other open user behavior. Accordingly, the present invention is applicable to information sharing to a greater extent, such as a project that requires coordinated cooperation or sharing information within a large transnational company.

Figure 8:
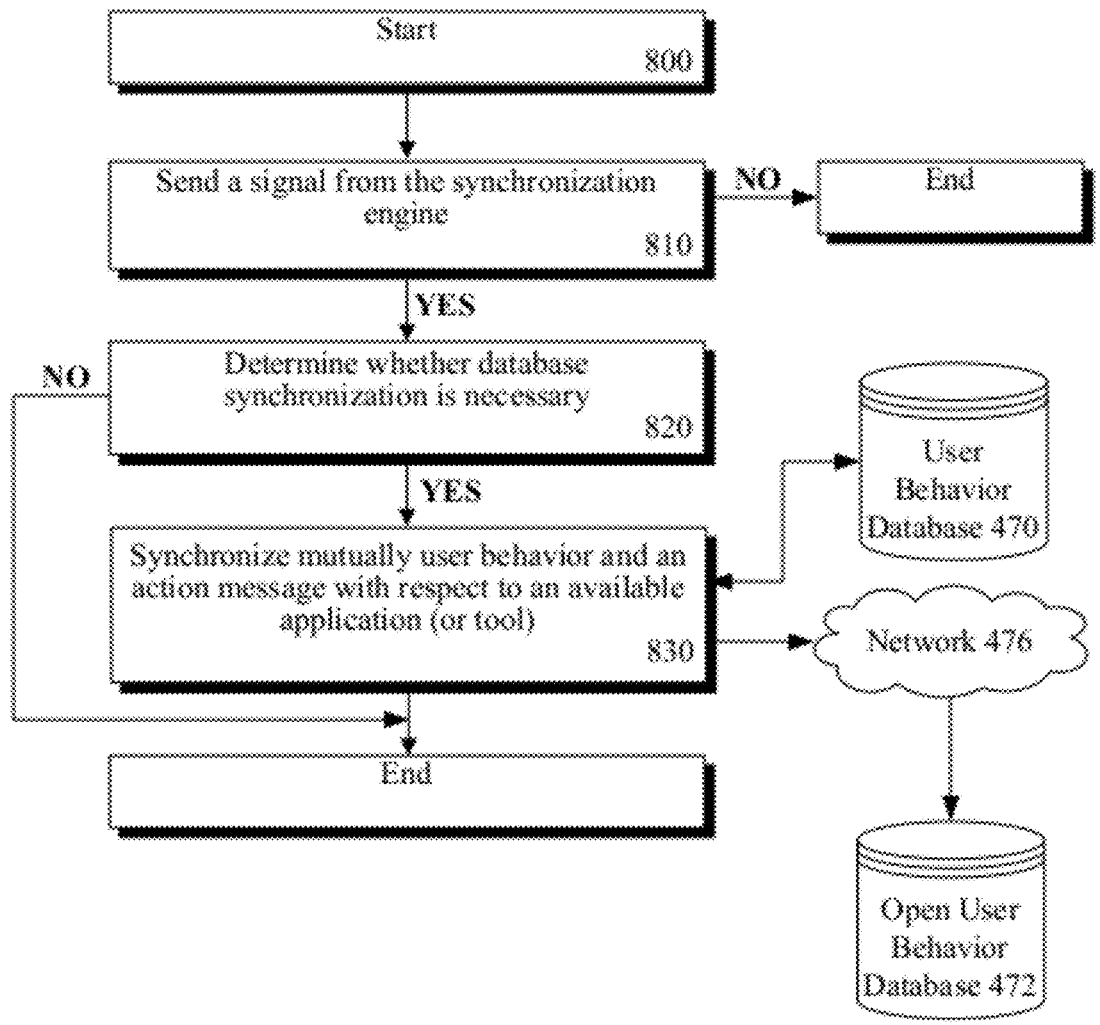
FIG. 8 is a flowchart of operation of the synchronizing engine according to an embodiment of the disclosure.

FIG. 8 is a flowchart of operation of the synchronizing engine according to an embodiment of the present invention. There will be a need for synchronization between user behavior databases of the different client-end computers, respectively, provided that each of the client-end computers includes a user behavior database and an information center built in the information center server 110, and each of the applications (such as an instant message system, an e-mail system, or a short message system) has an information plug-in. Once a client-end computer is connected to another client-end computer, the synchronizing engine of the client-end computers will be signaled to start the synchronization (step 810). Afterward, if the synchronization between the databases is required, the synchronizing engine will perform the synchronization between user behavior and action messages on available applications (or tools) (steps 820, 830). Due to the synchronization of unfinished action messages, the user can still dispatch information at appropriate times.

In general, the synchronizing engine also determines how to coordinate user behavior databases. For example, if a client-end computer is a mobile device and is capable of sending information only by means of a short message, the synchronizing engine can only synchronize data related to a short message so as to minimize the required storage space of the device. To share knowledge, the synchronizing engine synchronizes local user behavior and remote open user behavior databases. As a result, although the user does not have good experience in a certain theme, the user can still share information with an appropriate person by making use of another person's experience when confronted with the need to dispatch information; and this advantage is particularly valuable when it comes to a business that relies upon coordinated collaboration of teams.

Figure 9:
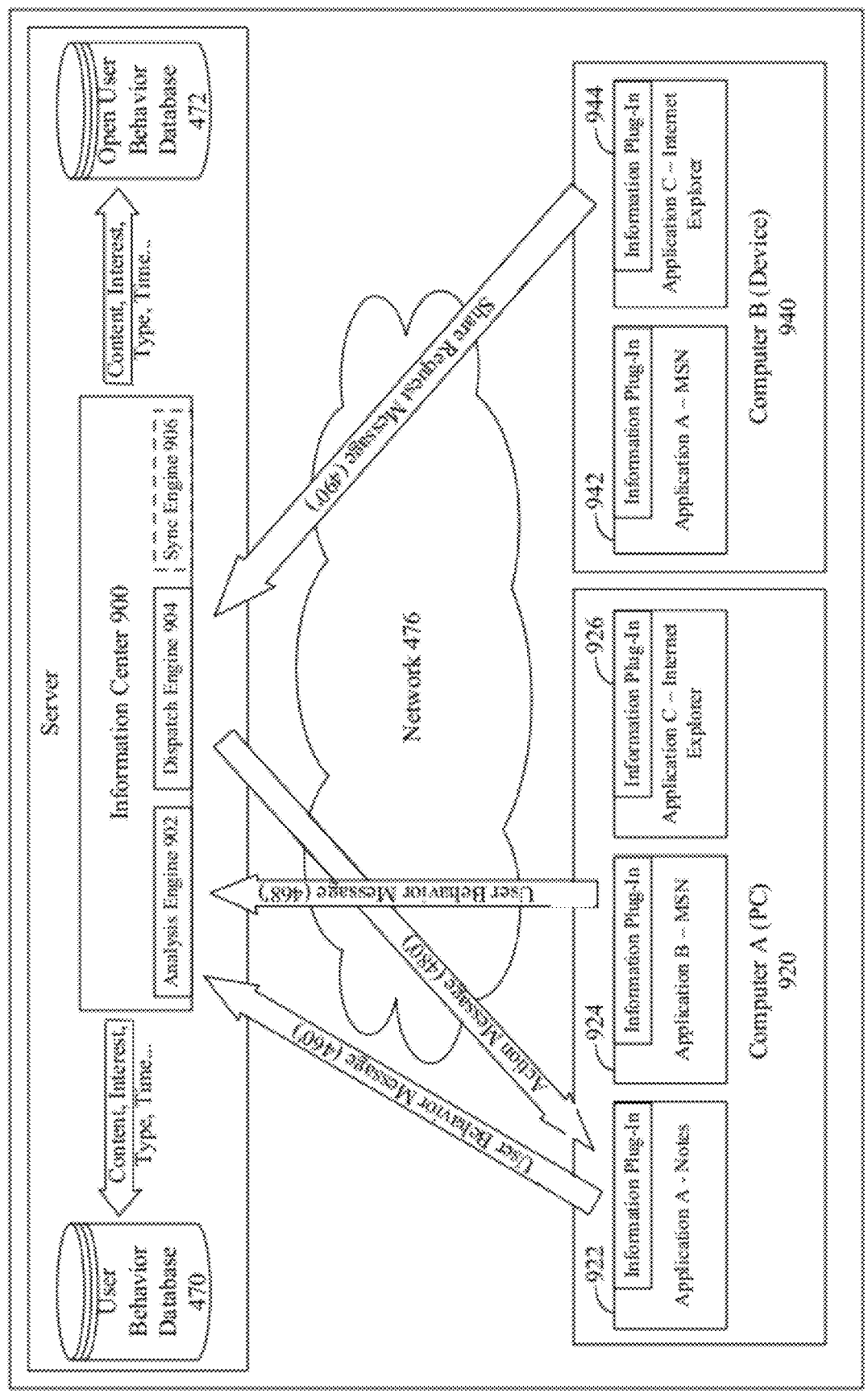
FIG. 9 is a schematic view of transmission of messages by the synchronizing engine operating and having a standalone information center server 110 according to an embodiment of the disclosure.

FIG. 9 is a schematic view of transmission of messages by the synchronizing engine 906 operating and having a standalone information center server according to an embodiment of the present invention. Due to the presence of a standalone information center server, there is not any need for synchronization of user behavior databases. However, if an unfinished action message is present in a client-end computer connected to the information center server, the synchronizing engine 906 can allow the user to dispatch information at appropriate time.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
    collecting information concerning a set of recipients of previously conveyed messages from a sender;
    determining and storing patterns between content of the previously conveyed messages and each of the set of recipients, wherein each of the patterns, determined from data associated with behavior of the sender, indicate a type of message content that has been frequently communicated to corresponding recipients, determined from behavior of the sender, wherein message information of the previously conveyed messages is stored along with the patterns, wherein the message information comprise a description of a location where a user, which is the sender, interacts with a person, which is one of the recipients;
    selecting textual information within a user interface to share with others;
    analyzing the selected information and matching it against the stored patterns, by calculating a similarity score between content of the previously conveyed messages and the selected information, wherein the subset of recipients is determined by the similarly score associated with a recipient being above a threshold, wherein other ones of the recipients having a similarly score below the threshold are not included in the determined subset of recipients;
    automatically determining a subset of the recipients that are likely to be interested in the selected information based on results of the analyzing and the matching; and
    conveying the information within at least one message from a sender device of the sender to one or more remotely located devices, wherein each of the one or more remotely located devices are devices associated with at least a portion of the subset of the recipients.

2. The method of claim 1, wherein the previously conveyed messages are conveyed using a plurality of different applications running on the sender device, each of the different applications being for a specific one of a plurality of different messaging types, each of the different messaging types having a recipient specific address associated that is unique to that one message type;
    said method further comprising:
        storing and indexing recipient specific addresses and messaging types for the previously conveyed messages, which are indexed against the stored patterns;
        when automatically determining the subset of recipients, also automatically determining a messaging type and a recipient specific address for each of the subset of recipients based on the stored and indexed information; and
        conveying the information to the portion of the subset of recipients, wherein the conveying is to the automatically determined recipient specific address and uses one of the different applications running on the sender device that is associated with the automatically determined messaging type.

3. The method of claim 2, wherein the different messaging types comprise at least three different messaging types selected from a group consisting of an email type, a short message type, a voice message type, a video conferencing type, and a micro-blogging type.

4. The method of claim 1, further comprising:
    automatically conveying the information from the sender device to remotely located devices of the subset of recipients without the sender ever manually inputting an identity of any of the recipients into a user interface, as the set of recipients is automatically determined using the patterns and results of the matching.

5. The method of claim 1, wherein the message information comprises a delivery type, a delivery time, and other alternative information, said other alternative information comprising, said person's gender and age, and a best available tool of delivery.

6. The method of claim 1, wherein said similarity score is a cosine similarity score between each existing group and each term-based information content and wherein said each term-based information content is calculated by a TF/IDF weighting technique or an equivalent technique so as to express as a "vector".

7. The method of claim 6, further comprising a step of determining shortlisted groups.

8. The method of claim 7, wherein said determining step further comprises comparing a similarity score threshold with said similarity score between each group and said information content to determine one or more shortlisted groups which said information content belongs to.

9. The method of claim 8, wherein said result of analysis comprises group information and related said previously conveyed messages, and each said group information comprises a "group ID" and a "vector" calculated by said TF/IDF weighting technique to represent one of said one or more shortlisted groups containing said information content.

10. The method of claim 9, further comprising a secondary text clustering step to re-calculate one or more "vectors" for representing said one or more shortlisted groups containing said information content by combining one or more "vectors" representing one or more shortlisted groups previously stored by said secondary text clustering but being indicated by said one or more group IDs with said information content by using said TF/IDF weighting technique;

wherein said secondary text clustering step, further included in a dispatching step, when targeted information is directly determined as belonging to a selected group, for re-calculating a "vector" for representing said selected group containing said targeted information.

11. The method of claim 10, further comprising a step of categorizing according to a user-made rule to determine whether said information content matches said user user-made rule and determine that said targeted information belongs to a specific group if keywords of said rule are present in said information content.

12. The method of claim 11, wherein said user-made rule comprises one or more user-made terms or a combination thereof for functioning as keywords according to said user's preference.

13. A computer program product for handling media, the computer program product comprising:
a non-transitory computer usable storage medium having computer usable program code embodied therewith, the computer usable program code comprising:
computer usable program code configured to collect information concerning a set of recipients of previously conveyed messages from a sender;
computer usable program code configured to determine and storing patterns between content of the previously conveyed messages and each of the set of recipients, wherein each of the patterns, determined from data associated with behavior of the sender, indicate a type of message content that has been frequently communicated to corresponding recipients, determined from behavior of the sender, wherein message information of the previously conveyed messages is stored along with the patterns, wherein the message information comprise a description of a location where a user, which is the sender, interacts with a person, which is one of the recipients;
computer usable program code configured to select textual information within a user interface to share with others;
computer usable program code configured to analyze the selected information and match it against the stored patterns by calculating a similarity score between content of the previously conveyed messages and the selected information, wherein the subset of recipients is determined by the similarly score associated with a recipient being above a threshold, wherein other ones of the recipients having a similarly score below the threshold are not included in the determined subset of recipients;
computer usable program code configured to automatically determine a subset of the recipients that are likely to be interested in the selected information based on results of the analyzing and the matching; and
computer usable program code configured to convey the information within at least one message from a sender device of the sender to one or more remotely located devices, wherein each of the one or more remotely located devices are devices associated with at least a portion of the subset of the recipients.

14. The computer program product of claim 13, wherein the previously conveyed messages are conveyed using a plurality of different applications running on the sender device, each of the different applications being for a specific one of a plurality of different messaging types, each of the different messaging types having a recipient specific address associated that is unique to that one message type;
said method further comprising:
computer usable program code configured to store and indexing recipient specific addresses and messaging types for the previously conveyed messages, which are indexed against the stored patterns;
computer usable program code configured to, when automatically determining the subset of recipients, also automatically determine a messaging type and a recipient specific address for each of the subset of recipients based on the stored and indexed information; and
computer usable program code configured to convey the information to the portion of the subset of recipients, wherein the conveying is to the automatically determined recipient specific address and uses one of the different applications running on the sender device that is associated with the automatically determined messaging type.

15. The computer program product of claim 14, wherein the different messaging types comprise at least three different messaging types selected from a group consisting of an email type, a short message type, a voice message type, a video conferencing type, and a micro-blogging type.

16. The computer program product of claim 13, further comprising:
computer usable program code configured to automatically convey the information from the sender device to remotely located devices of the subset of recipients without the sender ever manually inputting an identity of any of the recipients into a user interface, as the set of recipients is automatically determined using the patterns and results of the matching.

17. A system comprising a bus system, a memory connected to the bus system, wherein an instruction set is stored in the memory, a processing unit connected to the bus system, wherein said processing unit is configured to execute the instruction set, wherein when the system executes the instruction set said system is operable to:
collect information concerning a set of recipients of previously conveyed messages from a sender;
determine and storing patterns between content of the previously conveyed messages and each of the set of recipients, wherein each of the patterns, determined from data associated with behavior of the sender, indicate a type of message content that has been frequently communicated to corresponding recipients, determined from behavior of the sender, wherein message information of the previously conveyed messages is stored along with the patterns, wherein the message information comprise a description of a location where a user, which is the sender, interacts with a person, which is one of the recipients;

select textual information within a user interface to share with others; analyze the selected information and match it against the stored patterns by calculating a similarity score between content of the previously conveyed messages and the selected information, wherein the subset of recipients is determined by the similarly score associated with a recipient being above a threshold, wherein other ones of the recipients having a similarly score below the threshold are not included in the determined subset of recipients;

automatically determine a subset of the recipients that are likely to be interested in the selected information based on results of the analyzing and the matching; and convey the information within at least one message from a sender device of the sender to one or more remotely located devices, wherein each of the one or more remotely located devices are devices associated with at least a portion of the subset of the recipients.

\* \* \* \* \*